United States Patent Office 3,513,173
Patented May 19, 1970

3,513,173
DYES CONTAINING BENZ[c,d]INDOLE AND PYRAZOL-5-ONE GROUPS
Konrad Mix, Fechenheim, Germany, assignor to Cassella Farbwerke Mainkur Aktiengesellschaft, Frankfurt am Main, Fechenheim, Germany, a company of Germany
No Drawing. Filed May 29, 1967, Ser. No. 642,180
Claims priority, application Germany, Dec. 7, 1966, C 40,906; Feb. 3, 1967, C 41,407
Int. Cl. C09b 57/00
U.S. Cl. 260—310                            6 Claims

ABSTRACT OF THE DISCLOSURE

Very stable dyes have the formula

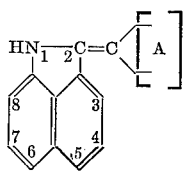

wherein A is a chromogen combination having at least one cyclic multiple-bond linkage or two acyclic multiple-bond linkages conjugated to the olefinic bond. These dyes are particularly desirable for dyeing polyesters a variety of different colors with particularly good fastness to light and to sublimation.

---

The present invention relates to dyes described in the foregoing abstract.

Among the objects of the present invention is the provision of novel dyes that are very resistant to loss of color as well as processes for making these dyes.

The foregoing as well as additional objects of the present invention will be more fully understood from the following description of several of its exemplifications.

The chromogen A portion of the dye molecule seems to lend itself to the making of very effective dyes as described above, regardless of the nature of that portion. This =C<[A] can by way of example have a 2,3-dihydro-thionaphthenone-3, pyrazolone, rhodanine, anthrone, indanedione or indolinone structure or it can have an aceto acetic ester type of structure. Particularly desirable are 2,3-dihydrothionaphthenone-3, pyrazolone-5 and rhodanine strutures.

The dyes of the present invention are very effective for dyeing polyester fibers and fabrics but they are also quite suitable for dyeing polyamides, urethanes, and similar synthetics, as well as wool, silk, cotton and rayon. They may have the usual type of substituents anywhere in the molecule. Typical substituents for this purpose include halogen such as fluorine, chlorine or bromine, alkyl— preferably up to 6 carbons, nitrile, carboxyl, esterified carboxyl, carboxyl amide, sulfonic acid, esterified sulfonic acid, sulfonamide, hydroxyl, alkoxyl with preferably up to 6 carbon atoms, and phenyl. The foregoing amide groups are preferably N-mono- or N-dialkyl substituted with each alkyl having up to 6 carbons. The esters are also preferably of alkanols having up to 6 carbons. Such substituents in the naphthostyril portion of the dye molecule are preferably in only the 5-, 6-, or 8-position, and in the case of alkoxy substituents they are preferably in the 5- or 6-position.

The following working examples more fully illustrate the invention, all temperatures being in degrees centigrade.

EXAMPLE 1

12 g. of the hydriodide of 6-ethoxy-2-methyl-mercapto-benz[c,d]indole (melting point 208–210°) are suspended in 25 cc. anhydrous pyridine. While stirring, 9 g. 1-phenyl-3-methyl-pyrazol-5-one are introduced into the suspension which then is heated to 100°. Condensation takes place with generation of methyl mercaptan and crystallization of the dyestuff even before the mixture is cooled. After the evolution of gas has come to an end, the reaction mixture is cooled down and diluted with methanol. The resultant crystalline precipitate is filtered off with suction, washed with methanol, and dried at 60°. Thus, 12 g. of a red brown, crystalline dye powder having a melting point of 211° is obtained.

*Analysis.*—Calculated (percent): C, 74.7; H, 5.19; N, 11.38; O, 8.67. Found (percent): C, 74.7; H, 5.2; N, 11.2; O, 8.5.

By admixing the mother liquor with water a further quantity of the dye may be precipitated. The dyestuff obtained yields, when applied to polyester materials, intense ruby dyeings or prints having an excellent fastness to light and sublimation.

For printing with this dye, the following paste is useful:

|  | G. |
|---|---|
| Dyeing composition prepared by grinding | 190 |
| Dye | 30 |
| Sodium salt of dinapthylmethane disulfonic acid | 30 |
| Distilled water | 130 |
| Stock thickening consisting of | 600 |
| Crystal gum thickening (1:3) | 480 |
| Water | 96 |
| Do | 210 |

Polyester fabric is printed with this paste, dried, heated for 50 seconds at 210°, subsequently cold rinsed, dipped for 20 minutes in a 50–60° acqueous solution of 6 cc. 38° Bé caustic soda and 3 g. sodium dithionite per liter, rinsed again, and dried. An intense ruby print of very good fastness properties is obtained.

EXAMPLE 2

A mixture of 130 g. 2-mercapto-6-methoxy-benz[c,d] indole (melting point: 216–218°) and 105 g. 1-phenyl-3-methylpyrazolon-5-one in 350 cc. nitrobenzene is heated to the boil for 15 minutes, the temperature reaching about 170–180°. At the end of this time the reactants are no longer detected by a thin-layer chromatogram, and the reaction mixture is allowed to cool down. A dye crystallizes out in the cold, is filtered off with suction and washed with methanol. After drying, 154 g. (72% yield) of a ruby dye having a melting point of 244–246° are obtained.

By steam distillation of the solvent it is possible to obtain a further quantity of the dye from the mother liquor. This crop contains impurities and may be purified by subsequent recrystallization from o-dichlorobenzene.

High temperature dyeing with this dyestuff imparts to polyester materials ruby dyeings of good fastness properties.

EXAMPLE 3

Operating according to the directions given in the first paragraph of Example 2 but with the 2-mercapto-6-methoxy-benz[c,d]indole replaced by the equimolecular amount of the corresponding 6-ethoxy compound (melting point 228°), produces in 78% yield in equivalent dyestuff with an ethoxy group and having a melting point of 211°.

By working up of the reaction mixture through steam distillation of the solvent, the dye is obtained with a 100% yield.

If in place of the nitrobenzene of the present example o-dichlorobenzene is used as a solvent, the heating is preferably effected at 180° for 2 to 5 hours, or until the end of the reaction is determined by thin-layer chromatography. The same dyestuff is obtained and it imparts intense ruby shades to polyester material.

The following table indicates two further dyestuffs of the invention formed by condensing the compounds listed in the first and second columns:

| Benz[c,d]indole | Active methylene compound | Melting point of the dye obtained, | Shade on polyester |
| --- | --- | --- | --- |
| 2-mercapto-6-(N,N-dimethyl-sulfonamide)-benz[c,d]indole. | 1-phenyl-3-methyl-pyrazol-5-one. | 270 | Brown. |
| 2-mercapto-6-(N-methyl-N-phenyl-sulfonamido)-benz[c,d]indole. | ----do---- | 255–256 | Do. |

The first of these two additional dyes is advantageously used as follows. One part of the dye is ground in a ball mill with 1 part of dinaphthylmethane disulfonic acid and 8 parts distilled water until the dye particles have an average size of about 1 micron. 75 grams of such a mixture is mixed with 4 g. polyethylene oxide having a molecular weight of 9000 and 50 g. alginate thickeners containing 4% alginate in water, and the mixture is diluted to one liter.

A preliminarily cleaned polyester fabric is padded on the foulard with the foregoing liquor (liquor absorption 60%), dried at 100° and then heated for 60 seconds at 210°. Then the fabric is given a reductive after-treatment for 20 minutes at 50–60° with an aqueous liquor containing per liter 6 cc. caustic soda solution (38° Bé) and 3 g./l. sodium dithionite. The fabric is now rinsed and dried. A coffee-brown dyeing of a very good fastness to light and an excellent fastness to sublimation and thermofixation is obtained.

EXAMPLE 4

To 17 grams of naphthostyril is added a solution of 21 grams PCl₅ in 150 cc. anhydrous chlorobenzene, and the mixture is heated at 50° until the evolution of HCl is terminated, which takes several hours. The resulting suspension of 2-chlorobenz[c,d]indole is gradually mixed with a solution of 18 grams 6-methoxy-3-hydroxy-thionaphthene in 100 cc. anhydrous chlorobenzene. A violent evolution of HCl takes place and red-brown crystals settle out. These crystals are filtered off in a suction filter, washed with benzene, then with methanol and finally with water, and the washed crystals are dried, yielding a dye that dissolves in organic solvents to give an intense red color. The dye can be recrystallized from chlorobenzene to give a purified product melting at 278 to 279°. It dissolves in concentrated sulfuric acid to give a red color, has the structure:

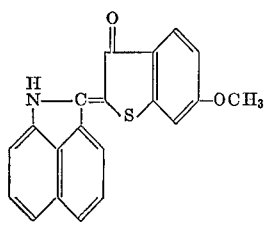

and very effectively dyes polyester fibers a fast red, particularly when the dyeing is effected at high temperatures.

EXAMPLE 5

19 g. 2-methoxy-benz[c,d]indole are mixed with 18 g. 6-methoxy-3-hydroxy-thionaphthene in 150 cc. dimethyl formamide, and the mixture is heated to 145° for 30 minutes. The reaction mixture is then poured into water and the precipitate thus formed filtered off with suction, washed thoroughly, and dried at 80°. The product is the same dyestuff produced by Example 4.

EXAMPLE 6

To a suspension of 23 g. 2-chloro-benz[c,d]indole-hydrochloride produced as in Example 4, is added 19.4 g. 6-ethoxy-3-hydroxy-thionaphthene and the mixture held until the evolution of hydrogen chloride is completed. The desired dye is recovered in the manner indicated in Example 4, and is a red dyestuff having a melting point of 267° after recrystallization. When used in the high-temperature dyeing of polyester materials it imparts yellowish red shades.

EXAMPLE 7

17 g. naphthostyril, 21 g. phosphorus pentachloride, and 18 g. 6-methoxy-3-hydroxy-thionaphthene are all stirred together in 150 cc. phosphorus oxychloride at 50° for 16 hours. The dyestuff of Example 4 precipitates out and is recovered in practically quantitative yield.

EXAMPLE 8

22.5 g. 2-chloro-benz[c,d]indole-hydrochloride are heated to 100° for 15 minutes in 100 cc. anhydrous xylene. This solution is then mixed with a solution of 17.5 g. 1-phenyl-3-methyl-pyrazol-5-one in 100 cc. anhydrous xylene and the temperature of the mixture is maintained at 100° for another 15 minutes. Hydrogen chloride is vigorously evolved and the color of the reaction mixture changes to a deep red brown. The solvent is removed from the resulting mixture by steam distillation, and the residue filtered off with suction to separate out the dye which is then dried. The product is a brown dyestuff which imparts to polyesthylene glycol terephthalate fibers golden yellow to orange shades having good fastness properties.

The following table indicates the shades polyester materials are dyed with further dyestuffs according to the present invention, made by similarly condensing 2-chloro- or 2-bromo-benz[c,d]indole or their hydrohalides with the following active methylene compounds:

| Active methylene compound | Shade of the dyestuff |
| --- | --- |
| 4-methyl-6-chloro-3-hydroxythionaphthene | Red violet. |
| 4-methyl-5,7-dichloro-3-hydroxythionaphthene | Blue violet. |
| 1,2 dihydro[2,1-b]naphthothiophene-1-one | Black brown. |
| 9-chloro-2,3-dihydro[1,2-b]naphthothione-1-one | Red violet. |
| Acetoacetic acid-o-anisidide | Yellow. |
| Indoxyl | Reddish blue. |
| Anthrone | Blue violet. |

EXAMPLE 9

5 g. indandione and 7 g. 2-methyl-mercapto-benz[c,d]indole in 20 c.c. dimethyl formamide are heated to 100° until the reaction which is accompanied by an evolution of gas is terminated. The reaction mixture is then cooled down, causing the separation of crystals which are filtered off with suction and washed with methanol. There is thus obtained 8.4 g. (82% yield) of a yellow crystalline dye having a melting point of 288°, which proves completely uniform in a thin-layer chromatogram. When used to dye polyester materials at high temperatures, it yields yellow dyeings with very good fastness properties.

The same dyestuff is obtained when the dimethyl formamide of the foregoing example is replaced by glacial acetic acid, octanol, or chlorobenzene.

The following table indicates further dyestuffs pursuant to the present invention which are formed by condensing the listed thioethers of naphthostyril with the listed active methylene compounds:

| Thioether | Active methylene compound | Melting point of the dyestuff obtained, degrees | Shade on poylester |
|---|---|---|---|
| 2-methyl-mercapto-benz[c,d]indole. | H₂C(C=N-C₆H₅)(C(=O)-N-C₆H₅) | 179 | Brown red. |
| Do. | H₂C(C(CH₃)=N)(C(=O)-N-C₆H₃Cl₂) | 282 | Red. |
| Do. | H₂C(S-C(=S))(C(=O)-NH) | 268 | Red. |
| Do. | H₂C(CO-CH₃)(CONH-C₆H₅) | 212 | Yellow. |
| Do. | H₂C-S-C₆H₃(OCH₃)-C(=O) (coumaranone with OCH₃) | 260-262 | Red. |
| 6-ethoxy-2-methyl-mercapto-benz[c,d]indole. | H₂C(C(CH₃)=N)(C(=O)-N-C₆H₃Cl₂) | 248 | Red. |
| Do. | H₂C(CO-C₆H₅)(COOC₂H₅) | 182 | Golden Yellow. |
| Do. | H₂C(S-C(=S))(C(=O)-NH) | 275 | Bluish red. |
| Do. | H₂C(CN)(CN) | 310 | Yellow. |
| Do. | H₂C(C(CH₃)=N)(C(=O)-NH) | 295 | Red. |

EXAMPLE 10

26.4 g. 1-(4'-sulfophenyl)-3-methyl-pyrazol-5-one and 19.9 g. 2-methyl-mercapto-benz[c,d]indole are stirred in 80 cc. dimethyl formamide at 100° for 2 hours. Condensation takes place and the reaction mixture is worked up by pouring it in 500 cc. water and precipitating the dye by the addition of 10% by volume common salt. The dye is filtered off with suction, washed with a 10% solution of common salt, and dried. A dyestuff is obtained which dyes wool and cotton from an alkaline to neutral dye bath brown shades having good fastness properties.

Additional active methylene compounds suitable for making dyes pursuant to the present invention include malonic esters as well as malonic acid amides or nitriles, acetylacetone, acetoacetic esters, cyanoacetic esters, barbituric acid and its derivatives, rhodanine (=2-thio-4-keto-thiazolidine), or 1,3-indanione, pyrazolones such as 1,3-diphenyl-pyrazol - 5-one, 3-methyl-1-(2,4'-dichlorophenyl)-pyrazol-5-one, 3-methyl-pyrazol - 5-one, and 3-methyl-1-phenyl-pyrazol-5-one as well as 3-hydroxy-thionaphthenes.

The active methylene compounds are preferably condensed with the benz[c,d]indoles in an inert, anhydrous solvent or diluent, such as benzene, toluene, xylene, chlorobenzenes, nitrobenzenes, dimethyl sulfoxide, or dimethyl formamide.

The reaction temperature for condensation may be widely varied. When condensing with the highly reactive 2-chloro, or 2-bromo-benz[c,d]indoles, the reaction may be run at room temperature, whereas the less reactive 2-alkyl-mercapto-benz[c,d]indoles and 2 - mercapto-benz[c,d]indoles generally call for some heating and may often be condensed at 100–250° C. only. When using for the reaction easily oxidizable indoles as compounds containing the active methylene group, it is suitable to work in a non-oxidizable solvent.

In view of the high reactivity of the 2-halogen-benz[c,d]indoles it is unnecessary to employ them in an isolated form, and they may be used in the form of their crude reaction mixtures as for example resulting from the halogenation of naphthostyril or its nuclear substitution products with the halides of phosphorus or sulfur, such as phosphorus pentachloride, phosphorus pentabromide, phosphorus oxychloride, or thionyl chloride. This halogenation of naphthostyril is preferably effected in an inert, anhydrous, organic solvent, and the resultant reaction mixture may be directly used for the reaction with the active methylene compound. Moreover, as in Example 7 a one-step process can be used, the naphthostyril or a nuclear substitution product thereof being added together with the active methylene compound and a halide of phosphorus or sulfur, such as phosphorus oxychloride, in a suitable anhydrous, inert organic solvent.

It will be noted that the benz[c,d]indole is bound by two bonds to the active methylene compound, although only a single bonding substituent is present on the benz[c,d]indole and it is held by a single bond. Such bonding substituents are chloro, bromo, mercapto, and alkoxy and alkyl mercapto in which the alkyl has up to 6 carbon atoms.

Obviously many modifications and variations of the present invention are possible in the light of the above teaching.

What is claimed is:
1. A dye having the formula

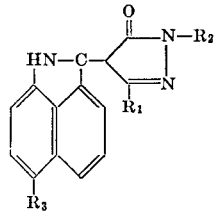

wherein $R_1$ is methyl or phenyl, $R_2$ is hydrogen, phenyl, 4-sulfophenyl or 2,4-dichlorophenyl and $R_3$ is hydrogen, methoxy, ethoxy, N,N-dimethylaminosulfonyl or N,N-phenylmethylaminosulfonyl.

2. The dye of claim 1 wherein $R_1$ is methyl, $R_2$ is phenyl and $R_3$ is methoxy or ethoxy.

3. The dye of claim 1 wherein $R_1$ is methyl, $R_2$ is phenyl and $R_3$ is N,N-dimethylaminosulfonyl or N,N-phenylmethylaminosulfonyl.

4. The dye of claim 1 wherein $R_1$ is methyl, $R_2$ is 2,4-dichlorophenyl and $R_3$ is hydrogen or ethoxy.

5. The dye of claim 1 wherein $R_1$ is methoxy, $R_2$ is phenyl and $R_3$ is hydrogen.

6. The dye of claim 1 wherein $R_1$ is phenyl, $R_2$ is phenyl and $R_3$ is hydrogen.

References Cited

UNITED STATES PATENTS 1,707,918  4/1929  Mayer et al. _____ 260—326.11
2,185,182  1/1940  Brooker _____ 260—326.11 XR

OTHER REFERENCES

Dokunikhin et al., Chem. Abstr., vol. 54, p. 17368 (1960).

Dokuniklin et al., Chem. Abstr., vol. 54, p. 24795 (1960).

FLOYD D. HIGEL, Primary Examiner

U.S. Cl. X.R.

8—4, 41, 50; 117—138.8; 260—302, 306.7, 319.1, 326.11, 326.16